(12) United States Patent
Erhardt et al.

(10) Patent No.: US 6,227,715 B1
(45) Date of Patent: May 8, 2001

(54) ROLLING BEARING ASSEMBLY FOR SUPPORT OF A STEERING SHAFT

(75) Inventors: Herbert Erhardt; Dirk Kidzun, both of Herzogenaurach (DE)

(73) Assignee: Ina Wälzlager Schaeffler Ohg, Herzogenaurach (DE)

( * ) Notice: Subject to any disclaimer, the term of this patent is extended or adjusted under 35 U.S.C. 154(b) by 0 days.

(21) Appl. No.: 09/456,374

(22) Filed: Dec. 8, 1999

Related U.S. Application Data

(60) Provisional application No. 60/111,561, filed on Dec. 9, 1998.

(51) Int. Cl.[7] ...................................................... F16C 33/58
(52) U.S. Cl. ........................................... 384/518; 384/537
(58) Field of Search ................................. 384/518, 535, 384/537, 539, 538

(56) References Cited

U.S. PATENT DOCUMENTS

| | | | |
|---|---|---|---|
| 4,541,742 | * | 9/1985 | Lederman ............................. 384/518 |
| 5,531,526 | * | 7/1996 | Labedan et al. ...................... 384/518 |
| 5,609,423 | * | 3/1997 | Jurik et al. ........................... 384/518 |
| 5,829,891 | * | 11/1998 | Beaman ................................ 384/495 |
| 5,975,766 | * | 11/1999 | Cau ...................................... 384/538 |

FOREIGN PATENT DOCUMENTS 40 13 655 C2   2/1994 (DE).

OTHER PUBLICATIONS

Publication, covering the technical seminar of the firm INA, entitled "Bearing Arrangements in the Chassis", 1988, see Fig. 1.

* cited by examiner

*Primary Examiner*—Thomas R. Hannon
(74) *Attorney, Agent, or Firm*—Henry M. Feiereisen

(57) ABSTRACT

A bearing assembly includes a rolling bearing, having an inner ring, an outer ring, rolling bodies arranged between the inner ring and the outer ring, and a clamping ring, for supporting a steering shaft and a further bearing, for supporting a steering shaft. The rolling bearing is further provided with a pre-tensioning element for axially loading the rolling bearing and the further bearing relative to one another, and a support element for axially supporting the steering shaft are further provided, with the outer ring circumscribing at least one of the pre-tensioning element and the support element at radial and axial distances to an inner surface area of the outer ring. A retention member holds the at least one of the pre-tensioning element and the support element in axial direction, to form an assembly unit, with the pre-tensioning element and the support element being integrated in the outer ring.

24 Claims, 5 Drawing Sheets

ROLLING BEARING ASSEMBLY FOR SUPPORT OF A STEERING SHAFT

CROSS-REFERENCES TO RELATED APPLICATIONS

This application claims benefit of prior filed copending provisional application Appl. No. 60/111,561, filed Dec. 9, 1998.

BACKGROUND OF THE INVENTION

The present invention relates, in general, to a bearing assembly for support of a steering shaft, and more particularly to a bearing assembly including a rolling bearing having an inner ring, an outer ring, rolling bodies arranged between the inner ring and the outer ring, and a clamping ring.

Rolling bearings of this type are used for support of steering shafts in steering columns of motor vehicles. In most cases, the bearing is an angular-contact ball bearing which is used together with a further angular-contact ball bearing and forms a bearing assembly with the further angular-contact ball bearing as well as different pre-tensioning and support elements.

FIG. 1 shows a sectional view of a steering column 1 with a conventional bearing assembly. The illustration has been copied from the printed publication covering the technical seminar of the firm INA and entitled "Bearing Arrangements in the Chassis", 1988. Supported for rotational movement in a stationary steering tube 2 is a steering shaft 3 via a first angular-contact ball bearing 4 and a second angular-contact ball bearing 5. The first angular-contact ball bearing 4 and the second angular-contact ball bearing 5 are securely press-fitted with their outer rings 4a, 5a in the steering tube 2. Associated to the inner ring 4b of first angular-contact ball bearing 4 is a first clamping ring 6, and a second clamping ring 7 is associated to the inner ring 5b of second angular-contact ball bearing 5. The second clamping ring 7 is supported by a shaft shoulder 3a in axial direction and centers the inner ring 5b on the shaft. The first clamping ring 6 is biased by a helical spring 8 against the inner ring 4b. The helical spring 8 is supported thereby by a washer 9. A safety ring 10 secures the seat of the washer 9 upon the steering shaft 3 in axial direction. The pre-tensioning force of the helical spring 8 effects that the first angular-contact ball bearing 4 and the second angular-contact ball bearing 5 are pre-tensioned relative to one another. The angular-contact ball bearings 4, 5 as well as the first clamping ring 6, the second clamping ring 7, the helical spring 8, the washer 9 and the safety ring 10 are supplied during assembly of the steering column 1 as single parts and individually mounted.

German Pat. No. DE 40 13 655 C2 describes also a bearing assembly by which a steering shaft is supported in a steering tube with a first angular-contact ball bearing and a second angular-contact ball bearing. The angular-contact ball bearing are formed by an outer ring, an inner ring and rolling bodies arranged between the tracks of the outer and inner rings. Oftentimes, the rolling bodies are further guided by a cage. In each angular-contact ball bearing, the respective inner ring is guided and centered on the steering shaft by an inner clamping ring via a cone.

Angular-contact ball bearings must be biased relative to one another in order to meet their bearing function. For this purpose, for example, the inner rings are, mutually biased in this assembly by a compression spring and are supported by the respective outer ring via the rolling bodies. The compression spring may be formed by a helical spring. Oftentimes, resilient disks of also utilized for this purpose, whereby a preferred embodiment of the resilient disks are the ondular springs. The compression spring acts at one end of the bearing assembly upon the clamping ring of the first angular-contact ball bearing which clamping ring transmits in turn the axial pre-tension upon the inner ring of the first angular-contact ball bearing. When the angular-contact ball bearing is biased, the cone of the clamping ring gets jammed in an angular gap located between the inner ring and the outer surface area of the steering shaft, with the compression spring being supported by the first support element. The pre-tensioning force generated by the compression spring is transmitted via the outer rings of the angular-contact ball bearings onto the inner ring and thus onto the clamping ring of the second angular-contact ball bearing. The reactive force is absorbed by a second support element. Also the clamping ring of the second angular-contact ball bearing gets jammed with its cone in an angular gap disposed between steering shaft and inner ring, when the angular-contact ball bearings are biased relative to one another.

Depending on the size of the angular gap to be bridged between the steering shaft and the inner ring of the angular-contact ball bearing, the clamping rings are either pre-assembled before assembly of the steering column on the inner ring of the bearing, or supplied as individual parts during assembly of the steering column. A pre-assembly of the clamping ring upon the inner ring of the angular-contact ball bearing can only be realized when this angular gap is large enough so that sufficient installation space is provided for the pre-assembly of a clamping ring. In the other case, and according to the example of DE 40 13 655 C2, the clamping ring is supplied as individual parts during the assembly of the steering column and pressed with its cone like a wedge into the narrow angular gap.

A prerequisite for transmitting the pre-tensioning force of the compression spring is the fixed support in axial direction of each of the first support element and the second support element by one end of the bearing assembly. At the same time, the steering shaft is thus supported and axially secured upon the bearing assembly.

The support of the compression spring and of the clamping ring upon the steering shaft can be realized by different support elements. For example, support elements can be used which are formed in one piece with the steering shaft, such as shaft shoulders or shaft projections, or support elements are used which are secured separately on or at the steering shaft. One of these separate means which is frequently utilized is a safety ring disposed for safety purposes on the steering shaft. This safety ring is pushed during assembly of the steering column on the steering shaft and locks there in a predetermined position in a groove or claws itself in a self-locking manner in the surface of the shaft. The safety ring is thereby in contact either directly with the compression spring or the clamping ring, respectively, or its support action is supported by an additional washer. For cost reasons, the use of a groove in the steering shaft is mostly omitted, and a self-locking ring, frequently designated also as pronged ring, is used. Depending on the arrangement of the angular-contact ball bearing and its pre-tensioning elements, the pronged ring supports either the compression spring or the clamping ring.

Thus, the installation of a steering column with such a bearing assembly requires the use of several individual parts, such as at least two rolling bearings, support and safety elements, a compression spring, and in the most unfavorable case individual clamping rings as well as washers. These single parts must be individually stored before assembly and individually supplied during installation. The logistics required hereby and the costs associated therewith for the installation of such steering columns are therefore high.

SUMMARY OF THE INVENTION

It is thus an object of the present invention to provide an improved bearing assembly for supporting a steering column, obviating the afore-stated drawbacks.

In particular, it is an object of the present invention to provide an improved rolling bearing which can be installed in a bearing assembly for support of a steering column at reduced logistics and less costs.

These objects, and others which will become apparent hereinafter, are attained in accordance with the present invention by providing a first rolling bearing for supporting a steering shaft at one location, with the rolling bearing including an inner ring, an outer ring, rolling bodies arranged between the inner ring and the outer ring, and a clamping ring; a second bearing for supporting the steering shaft at another location; a pre-tensioning element for axially loading the first bearing and the second bearing relative to one another; a support element for axially supporting the steering shaft, with the outer ring circumscribing at least one of the pre-tensioning element and the support element at radial and axial distances to an inner surface area of the outer ring; and a retention member for holding the at least one of the pre-tensioning element and the support element in axial direction.

It is thus provided according to the invention, to integrate either a pre-tensioning element or a support element, respectively, or a pre-tensioning element and a support element together, in the outer ring so as to be united with the rolling bearing to an assembly unit. During transport and handling of such rolling bearings, the elements are secured by retention means from separation in axial direction. Clamping rings which have been supplied heretofore as individual parts during installation of the steering column as a consequence of the previously described small angular gap between inner ring of the rolling bearing and the steering shaft, can also be pre-assembled in the rolling bearing as a result of the invention. The clamping rings are inserted during the assembly of the rolling bearing and held by the subsequently installed pre-tensioning or support element which in turn is secured in the outer ring. The logistics for the support and installation of such a bearing assembly in a steering column is reduced by the invention and restricted to the installation of the first and/or second rolling bearings formed as assembly unit. In particular during large scale production, significant costs can be saved in this manner.

As the pre-tensioning element as well as also the support element are connected with the steering shaft and therefore rotatable with respect to the stationary outer ring, a contact between these elements and the outer ring in assembled state in radial and axial directions must be prevented. For that reason, these elements are arranged in the outer ring at radial and axial distances to the inner surface area of the outer ring.

According to another feature of the present invention, the pre-tensioning element and the support element may be made from the following list of structures, for arrangement in the outer ring:
a resilient disk,
a resilient disk which is formed by an ondular spring,
a self locking safety ring,
a self locking safety ring which is formed by a pronged ring,
a support ring which forms a support seat on the shaft, and
an ondular spring and a pronged ring.

According to another aspect of the present invention, a support ring of U-shaped cross-section is integrated in the outer ring. The support ring opens towards the outside, when viewed in its cross-section. The first and second legs of this ring thus point with their free ends to the outside. The first leg is thereby arranged outside of the outer ring, while the second leg is circumscribed by the outer ring. The retention means thereby engage radially inwardly between the legs and thus engage behind the second leg.

According to another feature of the present invention, the retention member may be formed by the following structures:

the retention member may be formed by a collar which is either closed continuously or interrupted at the free and of the outer ring and pointing radially inwardly, the retention means may be formed by tongues which are punched out and bent radially inwardly at the free end of the outer ring, preferably spaced about the circumference at uniform distances to one another, and the retention means may be formed by radially inwardly pointing projections which are embossed at the free and or at least near in the free end of the outer ring, preferably spaced about the circumference at uniform distances to one another.

Suitably, the retention member is formed in one piece with the outer ring. As a result, the retention member is particularly suitable for rolling bearings having an outer ring made of thin-walled sheet metal as it can be made through a non-cutting manufacturing process. Persons skilled in the art will understand, however, that it is also conceivable to incorporate separately produced retention members in the outer ring. Thus, this invention is applicable also for rolling bearings with randomly formed and manufactured outer rings.

According to still another feature of the present invention, the support element is integrated in the outer ring by latching the support element during installation in the outer ring. The retention member, preferably embossed, is inserted in the outer ring during manufacture of the outer ring. In particular, during manufacture in a drawing process, such a retention member can be installed without additional costs. Costs for installing, swaging or bending of retention means during assembly of the bearing to the assembly unit are eliminated. In order for the support element to latch into the outer ring, the diametrical dimensions of the outer ring, the retention member and the support element must be suited to one another. The radially inwardly directed retention member bounds a free inner diameter in the outer ring. This free inner diameter must be smaller by a slight amount, which normally ranges between 0.03 mm and 1 mm, than the greatest outer diameter of the support element. When during installation the greatest outer diameter of the support element is pressed by the smaller free inner diameter of the outer ring, the mutually contacting parts, in particular the outer ring, react resiliently in elastic fashion. In this manner, the support element can latch into the outer ring of the bearing during installation and held captive.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
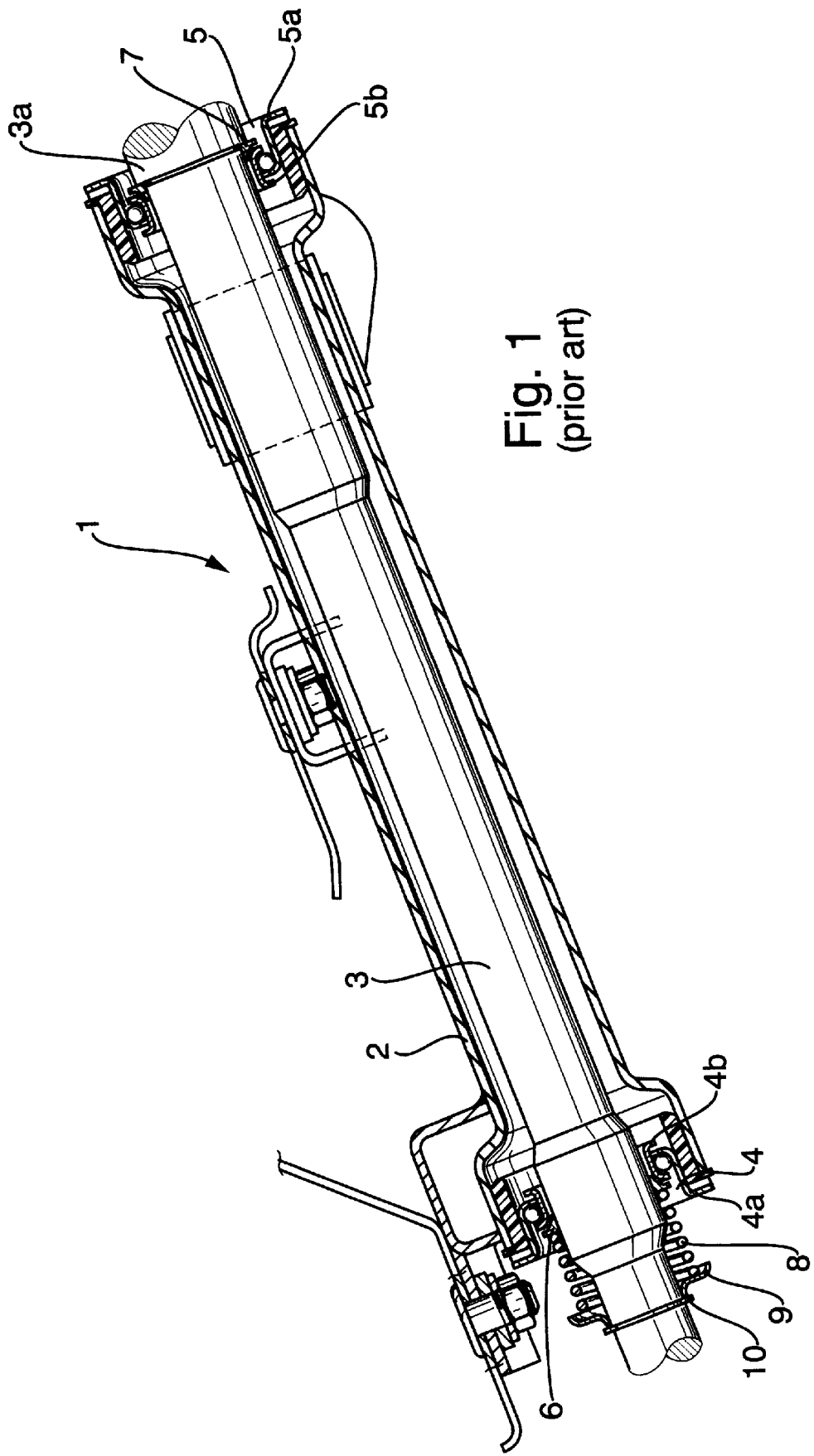
FIG. 1 is a sectional view of a steering column supported by a conventional bearing assembly.
Figure 2:
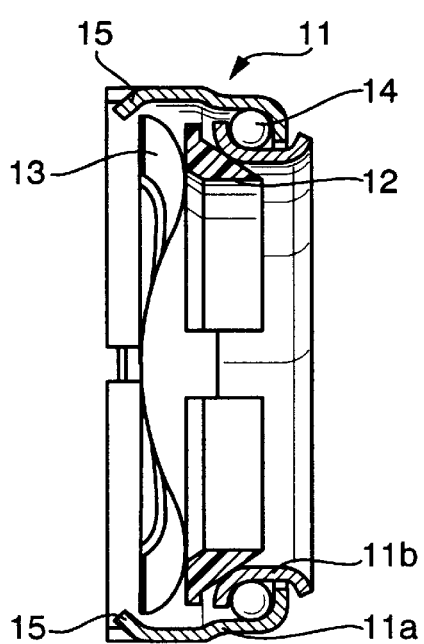
FIG. 2 is a longitudinal section of a first embodiment of a rolling bearing according to the present invention.

Turning now to the drawing, and in particular to FIG. 2, there is shown a longitudinal section of a first embodiment of a rolling bearing according to the present invention, in the form of an angular-contact ball bearing, generally designated by reference numeral 11 and having pre-assembled therein a plastics clamping ring 12 and an ondular spring 13. The angular-contact ball bearing 11 has an outer ring 11a and an inner ring 11b as well as rolling bodies 14 which are arranged between the inner ring 11b and the outer ring 11a, with the inner ring 11b, the outer ring 11a and the rolling bodies 14 being non-detachably mounted to one another. The plastics clamping ring 12 and the ondular spring 13 are loosely placed into the outer ring 11a and secured against falling out by tongues 15.

Figure 3:
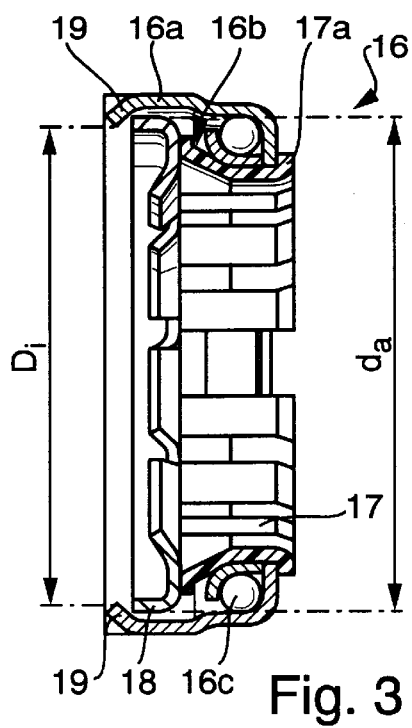
FIG. 3 is a longitudinal section of a second embodiment of a rolling bearing according to the present invention.
Figure 4:
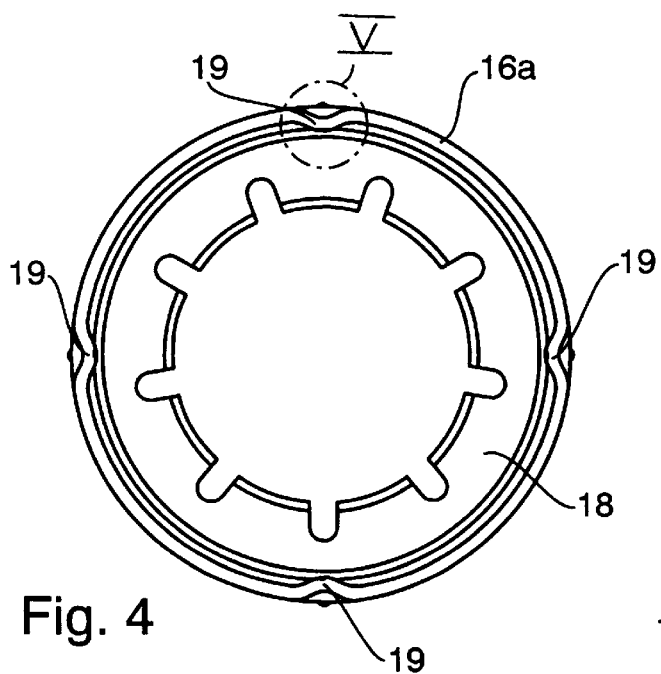
FIG. 4 is a 90° rotated illustration of the rolling bearing of FIG. 3.
Figure 5:
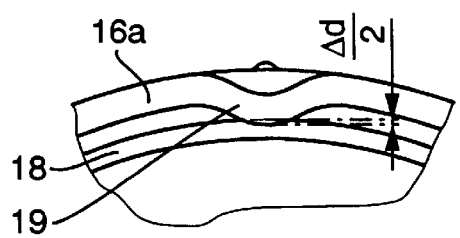
FIG. 5 is a cutaway view, on an enlarged scale, of detail marked V in FIG. 4.

FIGS. 3 to 5 show an angular-contact ball bearing 16 which has integrated therein a clamping ring 17 and a pronged ring 18. The clamping ring 17 engages with a snap collar 17a behind the outer ring 16a and thus holds the inner ring 16b, the outer ring 16a and the rolling bodies 16c of the angular-contact ball bearing 16 together. The outer ring 16a has embossed therein inwardly directed projections 19. The projections 19 are spaced at uniform distances about the circumference of the outer ring 16a and demarcate a free inner diameter $D_i$. As a consequence of the diameter $D_i$, the pronged ring 18 snaps with an outer diameter $d_a$ into the outer ring 16a. The outer diameter $d_a$ is greater than the free inner diameter $D_i$ by an amount $\Delta d$. As also shown in FIG. 5, each projection 19 engages behind the pronged ring 18, centered on the shaft, by the magnitude $\Delta d/2$.

Figure 6:
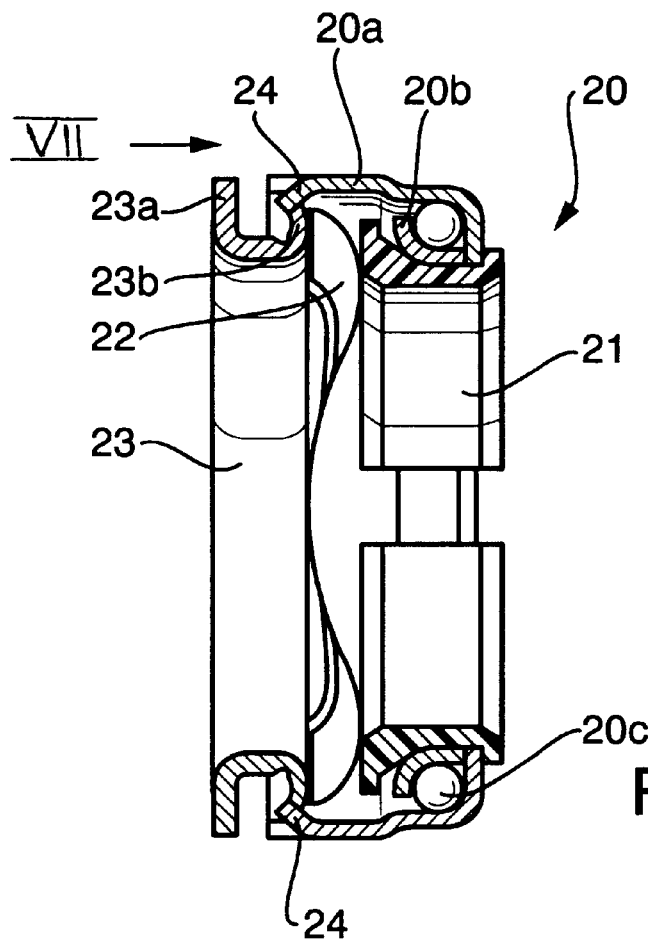
FIG. 6 is a longitudinal section of a third embodiment of a rolling bearing according to the present invention.
Figure 7:
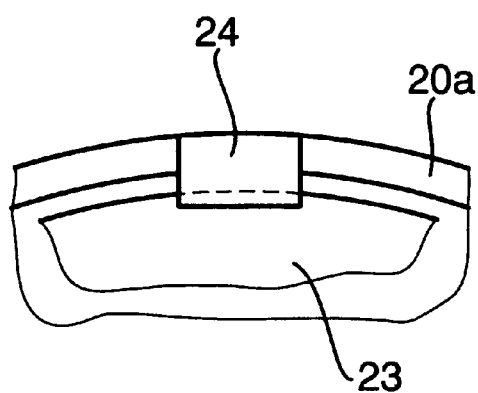
FIG. 7 is a cutaway view of the rolling bearing of FIG. 6 in 90° rotated illustration and on an enlarged scale, taken in the direction of arrow VII in FIG. 6.

Integrated in an angular-contact ball bearing 20 according to FIG. 6 and FIG. 7, are a clamping ring 21, an ondular spring 22 and a support ring 23. The clamping ring 21 snaps into the outer ring 20a of the angular-contact ball bearing 20 and thus holds the inner ring 20b, the outer ring 20a and the rolling bodies 20c together. The support ring 23 is configured with a U-shaped cross section. The first leg 23a of the support ring 23 is arranged outside the outer ring 20a, while the second leg 23b is circumscribed by the outer ring 20a. Retention tabs 24 engage behind the second leg 23b and thus secure the support ring 23 in axial direction. The ondular spring 22 sits loosely between the clamping ring 21 and the support ring 23.

Figure 8:
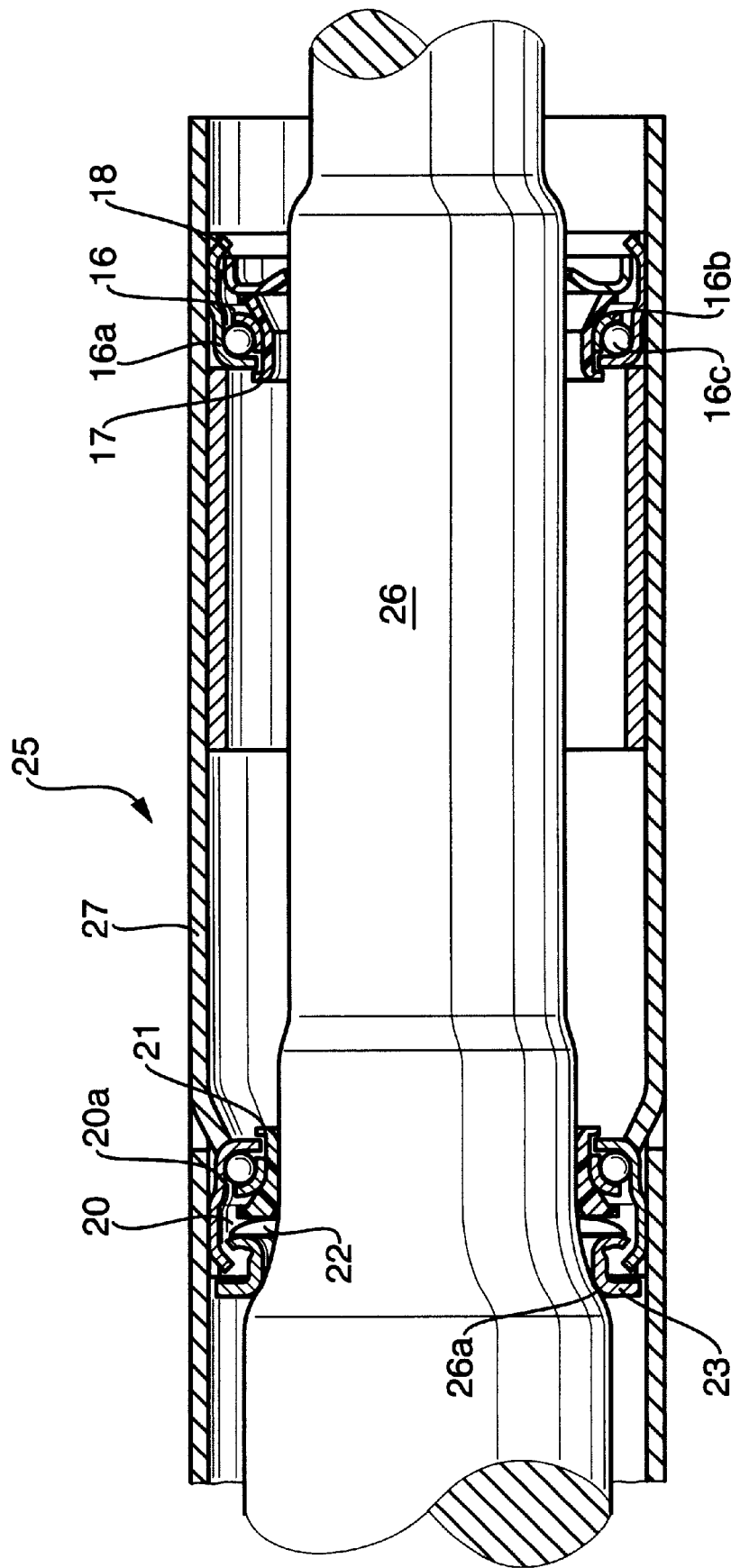
FIG. 8 is a sectional view of a bearing assembly for support of a steering column by means of two exemplified embodiments of rolling bearings according to the present invention.

FIG. 8 illustrates a bearing assembly 25 which has installed therein, for example, the angular-contact ball bearing 16 of FIG. 3 and the angular-contact ball bearing 20 of FIG. 7. The angular-contact ball bearing 16 and the angular-contact ball bearing 20 rotatably support a steering shaft 26 in a housing 27. The angular-contact ball bearings 16 and 20 are securely press-fitted with their outer rings 16a and 20a, respectively, in the housing 27. The support ring 23 of the angular-contact ball bearing 20 forms with a shaft shoulder 26a a support seat. The support ring 23 supports in turn the ondular spring 22. The ondular spring 22 loads the angular-contact ball bearings 16 and 20 relative to one another. The steering shaft 26 is secured in its axial position by the pronged ring 18. The pronged ring 18 is thereby supported by the clamping ring 17 and thus transmits, at the same time, the pre-tension of the ondular spring 22 onto the bearing assembly 25.

Figure 9:
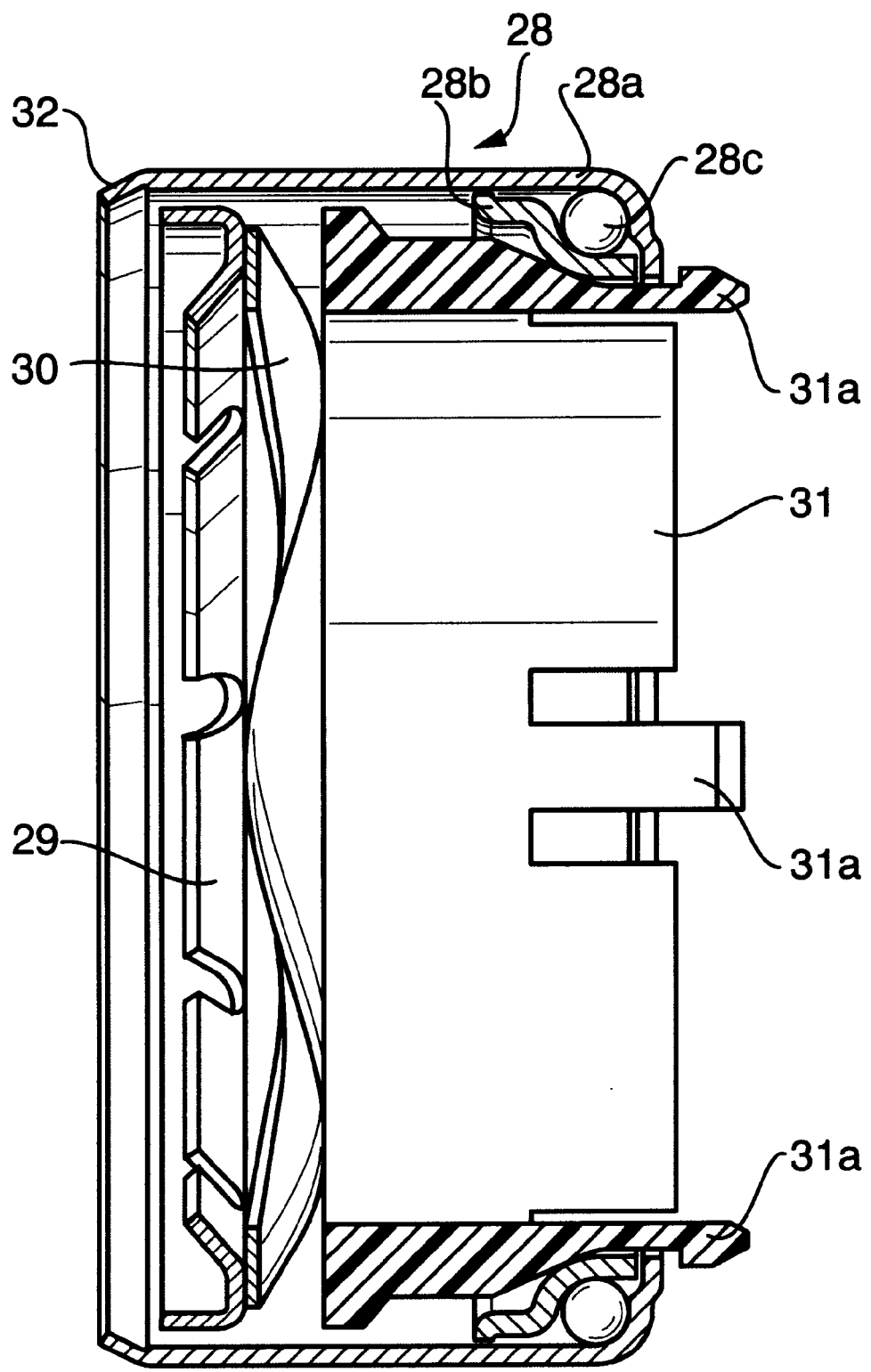
FIG. 9 is a sectional view of a fourth embodiment of a rolling bearing according to the present invention.

FIG. 9 shows an angular-contact ball bearing 28 including an outer ring 28a which has integrated therein a pronged ring 29, an ondular spring 30 and a clamping ring 31. The clamping ring 31 engages with snap lugs 31a behind the outer ring 28a and thus holds the inner ring 28b, the rolling bodies 28c and the outer ring 28a of the angular-contact ball bearing 28 together. The outer ring 28a is provided with a wraparound collar 32. By means of the collar 32 is the pronged ring 29 held captive in the outer ring 28a. The ondular spring 30 is loosely placed between the pronged ring 29 and the clamping ring 31.

While the invention has been illustrated and described as embodied in a rolling bearing assembly for support of a steering shaft, it is not intended to be limited to the details shown since various modifications and structural changes may be made without departing in any way from the spirit of the present invention.

What is claimed as new and desired to be protected by Letters Patent is set forth in the appended claims:

1. A bearing assembly for support of a steering shaft, said bearing assembly comprising:
    a first rolling bearing for supporting a steering shaft at one location, said rolling bearing including an inner ring, an outer ring, rolling bodies arranged between the inner ring and the outer ring, and a clamping ring;
    a second bearing for supporting the steering shaft at another location;
    a pre-tensioning element for axially loading the first bearing and the second bearing relative to one another;
    a support element for axially supporting the steering shaft, said outer ring circumscribing at least one of the pre-tensioning element and the support element at radial and axial distances to an inner surface area of the outer ring; and
    a retention member for holding the at least one of the pre-tensioning element and the support element in axial direction.

2. The bearing assembly of claim 1, wherein the pre-tensioning element is held in the outer ring and formed by a resilient disk, said resilient disk adjoining the clamping ring, as viewed in axial direction.

3. The bearing assembly of claim 2, wherein the resilient disk is an ondular spring.

4. The bearing assembly of claim 1, wherein the support element is held in the outer ring and formed by a self-locking safety ring with a self-locking seat on the steering shaft, said safety ring being disposed adjacent the clamping ring, as viewed in axial direction.

5. The bearing assembly of claim 4, wherein the self-locking safety ring is formed by a pronged ring.

6. The bearing assembly of claim 1, wherein the support element is held in the outer ring and formed by a support ring with a support seat on the steering shaft, said support ring disposed adjacent the clamping ring, as viewed in axial direction.

7. The bearing assembly of claim 6, wherein the support ring forms a ring of U-shaped cross section with a first leg extending continuously in circumferential direction and a second leg extending continuously in circumferential direction, each of said first and second legs having a free end which points outwardly in radial direction, with the free end of the first leg directed freely outwardly, and with the free end of the second leg surrounded by a cylindrically designed section of the outer ring, said retention member being formed by at least one radially inwardly pointing projection, with the projection hooking behind the second leg and engaging between the first and second legs.

8. The bearing assembly of claim 1, wherein the retention member is formed by a collar, with the collar being formed at a free end of the outer ring and pointing radially inwardly.

9. The bearing assembly of claim 1, wherein the retention member is formed by tongues, with the tongues being punched out at a free end of the outer ring and bent radially inwardly.

10. The bearing assembly of claim 1, wherein the retention member is formed by radially inwardly directed projections which are embossed at a free end of the outer ring and circumferentially spaced at uniform distances.

11. The bearing assembly of claim 1, wherein the pre-tensioning element is held in the outer ring and formed by an ondular spring, said support element held in the outer ring and formed by a pronged ring, wherein the ondular spring is disposed adjacent the clamping ring, when viewed in axial direction, and wherein the pronged ring is disposed adjacent the ondular spring, when viewed in axial direction, and is provided with a self-locking seat on the steering shaft, said retention member being formed by radially inwardly directed projections which are embossed at a free end of the outer ring and circumferentially spaced at uniform distances.

12. The bearing assembly of claim 1, wherein the support element is held in the outer ring, said retention member being formed in one piece with the outer ring and projecting radially inwardly, thereby defining a free inner diameter which is smaller than an outer diameter of the support element by a difference amount which corresponds to the extent by which the outer ring with the retention member elastically springs in radial direction during installation of the support element in the outer ring.

13. A rolling bearing for support of a steering shaft, comprising:
  an inner ring;
  an outer ring;
  rolling bodies arranged between the inner ring and the outer ring;
  a clamping ring placed inwardly of the inner ring;
  support means, surrounded by the outer ring, for maintaining the clamping ring in place; and
  a retention member for holding the support means in an axial direction at radial and axial distances to an inner surface area of the outer ring, thereby securing the support means and the clamping ring in place and realizing a pre-assembled bearing unit.

14. The rolling bearing of claim 13, wherein the support means includes a pre-tensioning element held in the outer ring and formed by a resilient disk, said resilient disk adjoining the clamping ring, as viewed in axial direction.

15. The rolling bearing of claim 14, wherein the resilient disk is an ondular spring.

16. The rolling bearing of claim 13, wherein the support means held in the outer ring includes a self-locking safety ring with a self-locking seat on the steering shaft, said safety ring being disposed adjacent the clamping ring, as viewed in axial direction.

17. The rolling bearing of claim 16, wherein the self-locking safety ring is formed by a pronged ring.

18. The rolling bearing of claim 13, wherein the support means includes a support ring with a support seat on the steering shaft, said support ring disposed adjacent the clamping ring, as viewed in axial direction.

19. The rolling bearing of claim 18, wherein the support ring forms a ring of U-shaped cross section with a first leg extending continuously in circumferential direction and a second leg extending continuously in circumferential direction, each of said first and second legs having a free end which points outwardly in radial direction, with the free end of the first leg directed freely outwardly, and with the free end of the second leg surrounded by a cylindrically designed section of the outer ring, said retention member being formed by at least one radially inwardly pointing projection, with the projection hooking behind the second leg and engaging between the first and second legs.

20. The rolling bearing of claim 13, wherein the retention member is formed by a collar, with the collar being formed at a free end of the outer ring and pointing radially inwardly.

21. The rolling bearing of claim 13, wherein the retention member is formed by tongues, with the tongues being punched out at a free end of the outer ring and bent radially inwardly.

22. The rolling bearing of claim 13, wherein the retention member is formed by radially inwardly directed projections which are embossed at a free end of the outer ring and circumferentially spaced at uniform distances.

23. The rolling bearing of claim 13, wherein the support means includes a pre-tensioning element in the form of an ondular spring, and a pronged ring, wherein the ondular spring is disposed adjacent the clamping ring, when viewed in axial direction, and wherein the pronged ring is disposed adjacent the ondular spring, when viewed in axial direction, and is provided with a self-locking seat on the steering shaft, said retention member being formed by radially inwardly directed projections which are embossed at a free end of the outer ring and circumferentially spaced at uniform distances.

24. The rolling bearing of claim 13, wherein the retention member is formed in one piece with the outer ring and projecting radially inwardly, thereby defining a free inner diameter which is smaller than an outer diameter of the support means by a difference amount which corresponds to the extent by which the outer ring with the retention member elastically springs in radial direction during installation of the support means in the outer ring.

* * * * *